United States Patent [19]

Blum et al.

[11] Patent Number: 4,580,534
[45] Date of Patent: Apr. 8, 1986

[54] ENGINE BARRING DEVICE

[75] Inventors: Randall B. Blum, Peoria; Raymond O. Starnes, Chillicothe, both of Ill.

[73] Assignee: Caterpillar Tractor Co., Peoria, Ill.

[21] Appl. No.: 686,103

[22] Filed: Dec. 24, 1984

[51] Int. Cl.⁴ .............................................. F02B 77/00
[52] U.S. Cl. ........................... 123/179 A; 123/179 F; 123/198 R; 74/405; 74/531; 74/625
[58] Field of Search ........... 123/179 F, 179 A, 198 R; 74/625, 414, 531, 405

[56] References Cited

U.S. PATENT DOCUMENTS

| | | | |
|---|---|---|---|
| 2,879,673 | 3/1959 | Passman | 74/531 |
| 3,321,985 | 5/1967 | Wheeler | 74/325 |
| 3,395,588 | 8/1968 | Bleigh et al. | 74/405 |
| 4,072,063 | 2/1978 | Nauman | 74/405 |

OTHER PUBLICATIONS

Service Publication, American Locomotive Company, Jun. 1974.

*Primary Examiner*—Andrew M. Dolinar
*Attorney, Agent, or Firm*—Larry G. Cain

[57] ABSTRACT

Engine barring devices are connected to engines. Known barring devices have been used to rotate crankshafts of engines and adding features to these known devices increases the complexity and cost of such devices. The subject barring device includes a shaft adapted for both axial and rotational movement. A gear is attached to one end of the shaft and is moved axially in a first direction to a first position where a holding device holds the shaft in the first position. In the first position the gear is engaged driving with a flywheel connected to the crankshaft of the engine. A tool engaging portion located on the shaft is adapted to engage with a turning tool. With the shaft in the first position, the turning tool can be used to rotate the crankshaft of the engine. A locking device is included to hold the crankshaft in one of the plurality of rotational positions. The subject barring device provides a holding device to hold the shaft in the first position, a device to disable the activation of a starting system, a tool engaging portion allowing rotation of the shaft and a locking device to lock the shaft in one of a plurality of rotational positions.

14 Claims, 3 Drawing Figures

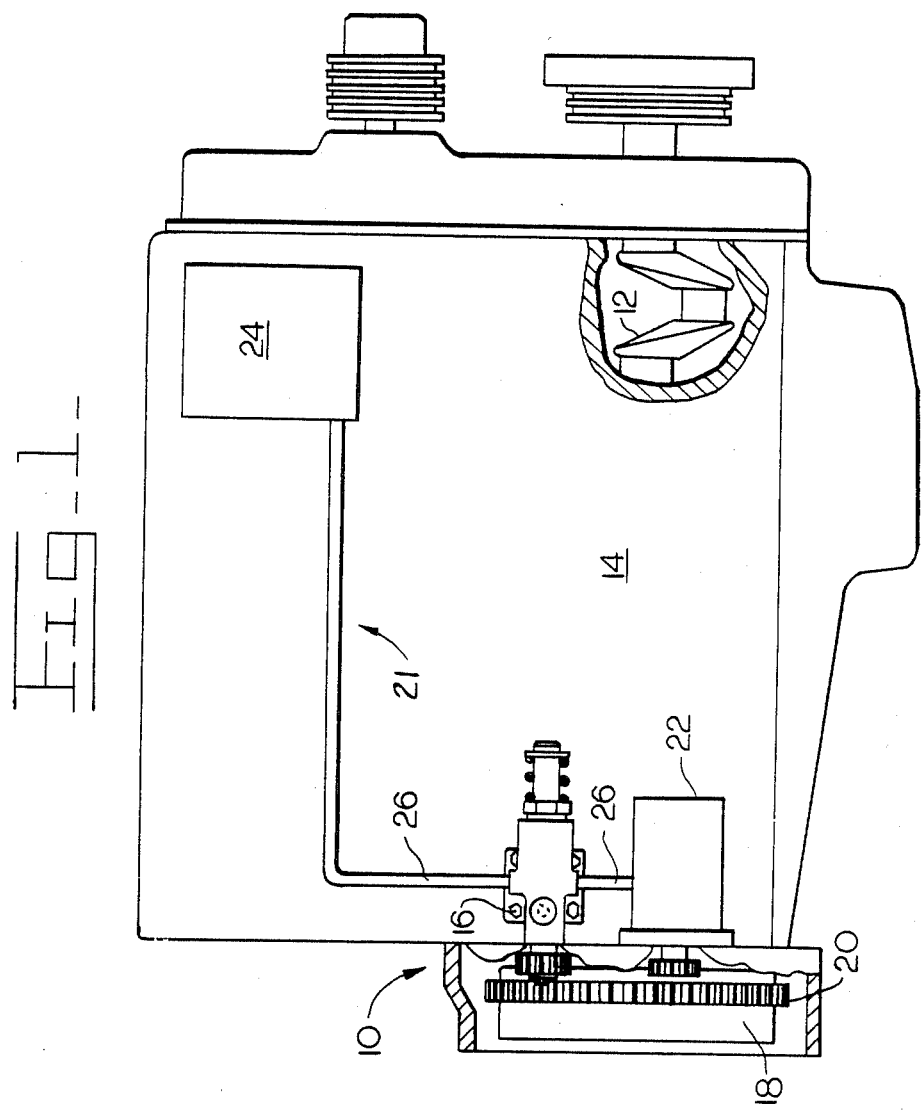

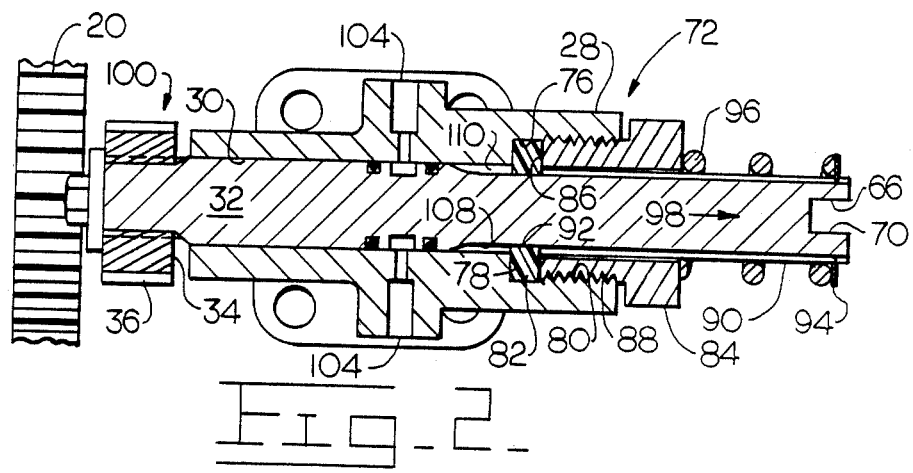
Fig_2_
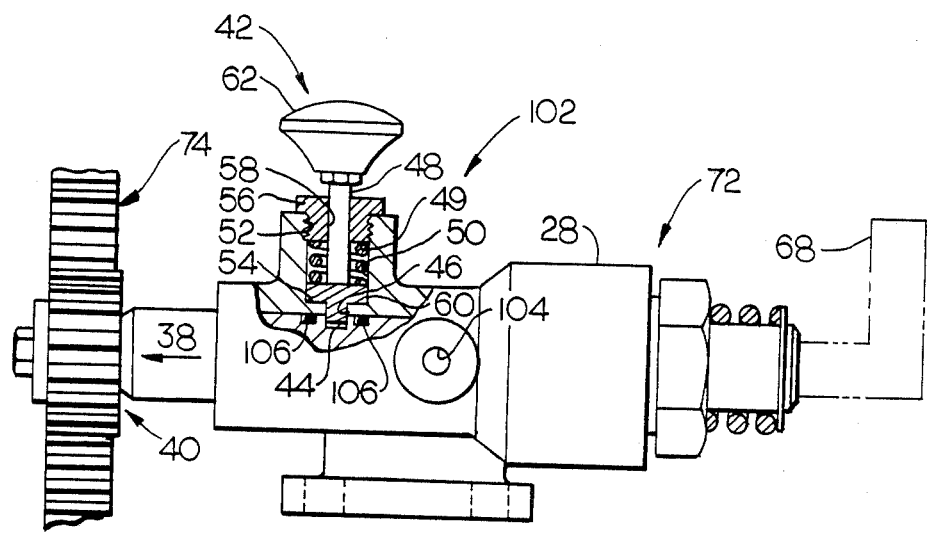
Fig_3_

ENGINE BARRING DEVICE

DESCRIPTION

1. Technical Field

This invention relates generally to engines and more particularly to a device for rotating a crankshaft of an engine into one of a plurality of rotational positions and holding the crankshaft in the one position.

2. Background

The engines of today are built to endure many hours of maintenance free service. The engines, however, do require repair and general maintenance. Many of the repair and maintenance functions require positioning the crankshaft and related components in a particular relationship to each other. In most instances the crankshaft is rotated to obtain this relationship. For example, the following U.S. Pat. No. 3,321,985 issued May 30, 1967 to Roland T. Wheeler, U.S. Pat. No. 3,395,588 issued Aug. 6, 1968 to Harold R. Bleigh, and U.S. Pat. No. 4,072,063 issued Feb. 7, 1978 to Harold J. Nauman disclose engine barring devices used to manually rotate the crankshaft of an engine. A service publication by American Locomotive Company dated June 1974 discloses a device for rotating the crankshaft of an engine which consists of an engine barring device having a pinion normally disengaged from the ring gear by a spring locking pin and a cam operated pilot air valve to prevent the engine from being started.

While the barring devices of each of the foregoing patents provide for a manual rotation device, each pose operational problems limiting their prospective uses.

Typically, the prior art utilizes a barring device totally independent of any starting device such as an air, hydraulic or electric starter, those which do utilize an anti-starting device are add-on type units thus if such starting devices were to be engaged the crankshaft would rotate. As engines become larger in size, the components also increase in size. If during the repair or maintenance of an engine, a connecting rod, for example, is removed from the crankshaft, the reduced weight could change the center of gravity of the crankshaft and cause the crankshaft to rotate.

The present invention is directed to overcoming one or more of the problems as set forth above.

DISCLOSURE OF THE INVENTION

In one aspect of the invention, a device is provided for rotating a crankshaft of an engine or a like component such as a compressor having a flywheel connected to the crankshaft and a plurality of external teeth on the flywheel. The device comprises a housing adapted to be connected to the engine and has a through bore therein, a shaft extends through the bore and has opposite ends, and is adapted for both axial and rotational movement within the bore. A gear is connected to one end of the shaft and the shaft is axially movable in a first direction to a first position so that the teeth on the gear and the flywheel will engage in driving relationship with each other when the device is installed on an engine. A means is provided for holding the shaft at the first position while leaving the shaft free for rotational movement. A tool engaging portion adapted to receive a turning tool, and a means for locking the shaft at one of a plurality of rotational positions are provided.

In another aspect of the present invention, an engine having a crankshaft, a flywheel with a plurality of external teeth thereon connected to the crankshaft, a starting system including a source of pressurized fluid, a fluid starting motor and a conduit means connecting the source of pressurized fluid to the fluid starting motor and a device for rotating the crankshaft of the engine. The device comprises a housing connected to the engine and having a through bore therein, a shaft extends through the bore and is adapted for both axial and rotational movement within the bore. A gear is connected to one end of the shaft which is axially movable in a first direction to a first position so that the gear and the flywheel are in driving relationship. A means is provided for holding the shaft at the first position while leaving the shaft free for rotational movement. A tool engaging portion of the shaft is adapted to receive a turning tool. A means for locking the shaft at one of a plurality of rotational positions, and a means for disabling the starting system blocking the conduit means from a fluid flow between the source of pressurized fluid and the fluid starting motor when the shaft is moved to the first position is provided.

Another aspect of the present invention, provides a method for rotating a crankshaft of an engine having a flywheel with a plurality of external teeth thereon. The improvement comprises the steps of: axially moving a shaft having a gear connected at one end in a first direction to a first position wherein the gear and the flywheel are drivingly connected; holding the shaft in the first position; engaging a tool in a tool engaging portion of the shaft; rotating the shaft and crankshaft to one of a plurality of rotational positions and locking the shaft at the one of the rotational positions.

The present invention provides a device for rotating a crankshaft of an engine into one of a plurality of rotational positions and holding the crankshaft in the one position so that repair, maintenance and tune-ups can be accomplished in a precise manner reducing cost and time. This arrangement eliminates the possibility of movement of the crankshaft during the repair or maintenance activity insuring the correct positioning of related components.

BRIEF DESCRIPTION OF THE DRAWINGS

FIG. 1 is a partial sectioned system view of an engine or compressor with the engine barring device attached thereto.

FIG. 2 is a section view taken through the center of the shaft.

FIG. 3 is a partial sectioned view of the engine barring device showing the device engaged with the flywheel and held in a first position.

BEST MODE OF CARRYING OUT THE INVENTION

Referring to the drawings, and more specifically to FIG. 1, a device 10 for rotating a crankshaft 12 of an engine 14 is shown attached to an engine 14 with fasteners 16.

The engine 14 includes a flywheel 18 which has a plurality of external teeth 20 thereon and is connected to the crankshaft 12 in a conventional manner. A starting system 21 includes a starter motor 22 which could be of either air, hydraulic or electric configuration, a power source 24 such as a compressor, hydraulic pump or battery are included with the engine 14, and a conduit means 26 between the source 24 and the device 10 and the device 10 and the starter motor 22.

Referring to FIG. 2 and FIG. 3, the device 10 comprises a housing 28 having a through bore 30 therein and a shaft 32 extends through the bore 30. The shaft 32 has opposite ends and a gear 34 having a plurality of external teeth 36 is attached to one end of the shaft 32 in a conventional manner. The shaft 32 is adapted for both axial and rotational movement within the bore 30 and is movable in a first direction 38 to a first position 40 so that the teeth 36 on the gear 34 will be drivingly connected with the teeth 20 on the flywheel 18 when the device 10 is installed on an engine 14. A means 42 for holding the shaft 32 at the first position 40 while leaving the shaft 32 free for rotational movement is best disclosed in FIG. 3.

The means 42 for holding includes an annular groove 44 in the shaft 32 located between the ends of the shaft 32, and a bore 46 located in the housing 28 intersecting the through bore 30. Also included is a rod 48 slidably located within the bore 46 and adapted to engage with the groove 44 when the shaft 32 is moved in the first direction 38 to the first position 40. Further included in the holding means 42 is a spring 49 adapted to automatically engage the rod 48 with the annular groove 44 when the shaft 32 is in the first position 40. Also included is a counterbore 50 coaxial with the intersecting bore 46 and having a threaded portion 52 and a bottom 54 and a threaded insert 56 engaged with the threaded portion 52 of the counterbore 50. A through passage 58 is located in the threaded insert 56. The rod 48 has opposite ends and an enlarged portion 60 intermediate the ends disposed between the bottom 54 of the counterbore 50 and the insert 56. A handle 62 is connected to the rod 48 at one end. The spring 49 surrounds the rod 48 and is located between the enlarged portion 60 and the insert 56 urging the rod 48 into the annular groove 44 when the shaft 32 is in the first position 38.

The shaft 32 includes a tool engaging portion 66 adapted to receive a turning tool 68 as shown in FIG. 3. The engaging portion 66 includes a square notch 70 located in the end of the shaft 32 opposite the gear 34 end. The notch 70 could be of any conventional configuration such as a hex or another shape.

A means 72 for locking the shaft 32 at one of a plurality of rotational positions 74 is also shown in FIG. 2. The means 72 for locking includes a counterbore 76 in the housing 28 coaxial with the through bore 30, a shoulder 78 at one end of the counterbore 76 and a threaded portion 80 at the other end of the counterbore 76. Also included is an annular locking mechanism 82 nonrotatably fixed to and axially slidably supported on the shaft 32, along with a nut 84 which has a frictional surface 86 at one end and an externally threaded portion 88. The nut 84 is slidably fitted over the shaft 32 and adapted to threadably engage the threaded portion 80 of the counterbore 76 in the housing 28 so that when the nut 84 is rotated in a direction to move the nut 84 toward the shoulder 78 on the housing 28, the annular locking mechanism 82 is clamped between the locking mechanism engaging surface 86 and the shoulder 78 preventing the shaft 32 from rotating. As further shown in FIG. 2, the means 72 for locking includes an external spline 90 on the shaft 32 located at the end opposite the gear 34 end along with an internal spline 92 in the locking mechanism 82 adapted to engage with the external spline 90 on the shaft 32 allowing the shaft 32 to be movable in the first direction 38 to the first position 40.

The device 10 further includes an abutting surface 94 located on the shaft 32 at the end opposite the gear 34 end and a spring 96 surrounding the shaft 32 and located between the nut 84 and the abutting surface 94. The spring 96 urges the shaft 32 in a second direction 98 to a second position 100 wherein the gear 34 on the shaft 32 is disengaged from the teeth 20 on the flywheel 18.

With the engine 14 having a starting system 21 as discussed above, the device 10 would further include a means 101 for disabling the starting system 21. The means 101 for disabling includes a means 102 for blocking the conduit 26 between the source of pressurized fluid 24 and the fluid starting motor 22. The means 102 for blocking includes a pair of ports 104 in the housing 28 connected to the through bore 30 and a pair of seals 106 located on the shaft 32 on each side of the annular groove 44. One of the pair of seals 106 prevents the fluid from passing from the power source 24 of pressurized fluid to the fluid starter motor 22 when the shaft 32 is in the first position 40. The means 102 for blocking the pressurized fluid also include means 108 for venting the fluid to the atmosphere. The means 108 for venting includes a clearance space 110 between the housing 28 and the shaft 32 and the clearance between the internal splines 92 in the locking mechanism 82 and the external spline 90 on the shaft 32. The clearance space in this specific embodiment is provided by the spline grooves in the shaft 32.

Industrial Applicability

The device 10 for rotating the crankshaft 12 of an engine 14 or a like component such as a compressor is connected to the engine 14. The application of the device 10 as discussed below will feature an air starter 22 in conjunction with the device 10. During normal operation of the engine 14 and starter 22, air from a power source 24 flows through the line 26 to the device 10, through one of the pair of ports 104, around the groove 44 in the shaft 32 and out the other of the pair of ports 104 through line 26 to rotate the starter 22 thus rotating the crankshaft 12 of the engine 14.

However, during maintenance of the engine 14, the barring device 10 is adapted to disable the starting system to prevent rotation of the starter 22 and enable rotation of the crankshaft 12 with the turning tool 68. For example, if during the maintenance of the engine 14 the crankshaft 12 needs to be rotated a very small angle the engine barring device 10 can be used. To activate the barring device 10, the mechanic exerts a small axial force on the end of the shaft 32 to overcome the force of the spring 96 moving the shaft 32 in the first direction 38 to a first position 40. The holding means 42 holds the shaft 32 in the first position 40 because as the shaft 32 is moved in the first direction 38 and the annular groove 44 is aligned with the end of the rod 48, the spring 64 biases the rod 48 inwardly causing the end of the rod 48 to enter into the groove 44. The shaft 32 is held in the first position 40 with the teeth 36 on the gear 34 meshed with the teeth 20 on the flywheel 18. A turning tool 68, such as a wrench, ratchet or impact wrench, can be inserted into the tool engaging portion 66 in the shaft 32. Using the tool 68, the mechanic rotates the shaft 32 until the crankshaft 12 of the engine 14 is located in a precisely desired position. The mechanic locks the crankshaft 12 in this one desired position by tightening the nut 84 into the threaded portion 80 of the counterbore 76 to clamp the annular locking mechanism 82 between the shoulder 78 and the frictional surface 86 on the nut. The internal splines 92 on the locking mechanism 82 which are meshed with the external splines 90 on the shaft 32 prevents the shaft 32, gear 34, flywheel 18 and crankshaft 12 from rotating. Thus, the crankshaft 12 is held in the precisely desired position and is prevented from rotating.

If the starting system 21 is activated with the barring device 10 engaged, as described above, the flow to the air starter 22 is interrupted preventing the starter 22 from rotating the crankshaft 12. As the shaft 32 is moved in the first direction 38, the pair of seals 106 and the groove 44 move relative to the housing 28. The pair of seals 106 and the groove 44 move beyond the pair of ports 104, thus allowing air to escape to atmosphere through the clearance space 110 between the housing 28 and the shaft 32.

After maintenance has been completed, the barring device 10 is returned to the second position 100 by release of the holding means 42. The handle 62 on the rod 48 is moved to extract the end of the rod 48 from the groove 44. The spring 96 will urge the shaft 32 in the second axial direction 98 into the second position 100 wherein the gear 34 on the shaft 32 is disengaged from the teeth 20 on the flywheel 18.

The engine barring device 10 discussed above provides for an economical and positive positioning device 10. The barring device 10 interrupts the starting mode of the engine when in the first position 40 preventing the starter 22 from rotating the crankshaft 12. The device 10 is automatically held in the first position 40 enabling the mechanic to rotate the crankshaft 12 without having to manually hold the device 10 in engagement with flywheel 18. The device is also adapted to lock the crankshaft 12 in a precisely desired position preventing the crankshaft 12 from rotating.

Other aspects, objects and advantages of this invention can be obtained from a study of the drawings, the disclosure and the appended claims.

We claim:

1. A device for rotating a crankshaft of an engine, said engine having a flywheel connected to the crankshaft and said flywheel having a plurality of external teeth thereon, said device comprising:
   a housing adapted to be connected to the engine, said housing having a through bore therein;
   a shaft extending through the bore and having opposite ends, said shaft being adapted for both axial and rotational movement within the bore;
   a gear connected to one end of the shaft and said shaft being axially movable in a first direction to a first position so that the gear and the flywheel will engage in driving relationship with each other when the device is installed on an engine;
   means for holding the shaft at the first position while leaving said shaft free for rotational movement;
   a tool engaging portion adapted to receive a turning tool; and
   means for locking the shaft at one of a plurality of rotational positions.

2. The device of claim 1 wherein the means for holding includes an annular groove in the shaft located between the ends of the shaft, a bore in the housing intersecting the through bore and a rod slidably located within the bore, said rod adapted to engage with the groove when said shaft is moved in the first direction to the first position.

3. The device of claim 2 wherein the means for holding includes a spring adapted to automatically engage the rod with the annular groove to hold the shaft in the first position with the flywheel and the gear engaged.

4. The device of claim 1 wherein the means for locking includes an annular locking mechanism nonrotatably fixed to and axially slidably supported on the shaft and a nut operatively associated with the housing for clamping the annular locking mechanism therebetween to resist rotation of the shaft.

5. The device of claim 4 wherein the means for locking further includes a shoulder defined on the housing, the nut having a frictional surface and threadably engaged with the housing and adapted to clamp the annular locking mechanism between the shoulder and the frictional surface of the nut as the nut is rotated in a direction to move it toward the shoulder on the housing.

6. The device of claim 5 wherein the means for locking includes an external spline on the shaft located at the end opposite the gear end, an internal spline in the locking mechanism adapted to engage with the external spline allowing said shaft to be movable in the first direction to the first position.

7. The device of claim 1 further including an abutting surface located on the shaft at the end opposite the gear end, a spring surrounding the shaft and located between the locking means and the abutting surface, said spring urging the shaft in a second axial direction to a second position wherein the gear on the shaft is in a disengaged position.

8. In an engine having a crankshaft, a flywheel with a plurality of external teeth thereon connected to the crankshaft, a starting system including a source of pressurized fluid, a fluid starting motor and a conduit means connecting the source of pressurized fluid to the fluid starting motor, and a device for rotating the crankshaft of the engine, said device comprising:
   a housing connected to the engine, said housing having a through bore therein;
   a shaft extending through the bore and having opposite ends, said shaft being adapted for both axial and rotational movement within the bore;
   a gear connected to one end of the shaft, said shaft being axially movable in a first direction to a first position so that the gear and the flywheel are in driving relationship;
   means for holding the shaft at the first position while leaving said shaft free for rotational movement;
   a tool engaging portion adapted to receive a turning tool;
   means for locking the shaft at one of a plurality of rotational positions; and
   means for disabling the starting system when the shaft is moved to the first position.

9. The device of claim 8 wherein said means for disabling includes a means for blocking the conduit means between the source of pressurized fluid and the fluid starting motor.

10. The device of claim 8 wherein said blocking means includes a pair of ports connected to the through bore in the housing, a pair of seals located on the shaft intermediate the ends, an annular groove between the seals so that when the shaft is in the first position one of the pair of seals prevents the fluid from passing from the source of pressurized fluid to the fluid starting motor.

11. The device of claim 9 wherein said blocking means includes a means for venting the pressurized fluid to the atmosphere.

12. The device of claim 10, wherein said means for venting the pressurized fluid to the atmosphere includes a clearance space between the housing and the shaft.

13. A method for rotating a crankshaft of an engine, having a flywheel with a plurality of external teeth thereon connected to the crankshaft, the improvement comprising the steps of:

axially moving a shaft having a gear connected at one end in a first direction to a first position, wherein the gear and the flywheel are drivingly connected;

holding the shaft in the first position;

engaging a tool with a tool engaging portion of the shaft;

rotating the shaft and the crankshaft with the tool, to one of a plurality of rotational positions and locking the shaft at the one of the rotational positions.

14. The method of rotating a crankshaft of claim 13 wherein the axially moving the shaft in the first direction to the first position includes the step of:

blocking the communication between a source of pressurized fluid and a fluid starting motor.